US009659271B2

(12) United States Patent
Shakes

(10) Patent No.: US 9,659,271 B2
(45) Date of Patent: May 23, 2017

(54) PROTECTION OF PRIVACY IN CONNECTION WITH SHIPMENT OF PRODUCTS

(71) Applicant: Amazon Technologies, Inc., Reno, NV (US)

(72) Inventor: Jonathan J. Shakes, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 974 days.

(21) Appl. No.: 13/914,133

(22) Filed: Jun. 10, 2013

(65) Prior Publication Data

US 2013/0275325 A1 Oct. 17, 2013

Related U.S. Application Data

(63) Continuation of application No. 12/975,888, filed on Dec. 22, 2010, now Pat. No. 8,463,659.

(30) Foreign Application Priority Data

Dec. 7, 2010 (CN) .......................... 2010 1 0587160

(51) Int. Cl.
*G06Q 10/08* (2012.01)
*G06Q 30/06* (2012.01)
(52) U.S. Cl.
CPC ....... *G06Q 10/083* (2013.01); *G06Q 30/0601* (2013.01)
(58) Field of Classification Search
CPC .............................. G06Q 10/08; G06Q 50/28
USPC ........................................................ 705/330
See application file for complete search history.

(56) References Cited

U.S. PATENT DOCUMENTS

| 6,694,217 | B2 | 2/2004 | Bloom |
| 6,748,366 | B1 | 6/2004 | Hurwitz et al. |
| 6,987,841 | B1 | 1/2006 | Byers et al. |
| 7,375,841 | B1 | 5/2008 | Polis et al. |
| 7,376,598 | B2 | 5/2008 | Estes et al. |
| 7,627,533 | B2 | 12/2009 | Kokko |
| 2002/0013739 | A1* | 1/2002 | O'Donnell ............. G06Q 10/08 705/26.81 |

(Continued)

FOREIGN PATENT DOCUMENTS

CN 1467667 A 1/2004
CN 1703917 A 11/2005

(Continued)

OTHER PUBLICATIONS

Canadian Office Action dated Feb. 3, 2016 in co-pending Application No. 2,814,418 filed Nov. 22, 2011.

(Continued)

*Primary Examiner* — Mila Airapetian
(74) *Attorney, Agent, or Firm* — Thomas Horstmeyer, LLP

(57) ABSTRACT

Disclosed are various embodiments for enhancing protection of privacy of purchaser contact details in connection with shipment of parcels. A shipping label can be generated that includes at least one contact detail that hides an actual contact detail associated with a purchaser. A carrier tasked to ship and/or deliver the product to an address designated by the purchaser can use the at least one contact detail to contact the purchaser. The attempts to contact the purchaser can be logged, and the contact details are expired when no longer needed.

20 Claims, 5 Drawing Sheets

(56) References Cited

U.S. PATENT DOCUMENTS

| | | |
|---|---|---|
| 2002/0022967 A1 | 2/2002 | Ohkado |
| 2006/0178994 A1 | 8/2006 | Stolfo et al. |
| 2006/0274896 A1 | 12/2006 | Livesay |
| 2008/0084982 A1 | 4/2008 | Chatterjee |
| 2008/0168047 A1 | 7/2008 | Chatterjee |
| 2008/0208611 A1* | 8/2008 | Krooss ............... G06Q 10/08 705/1.1 |

FOREIGN PATENT DOCUMENTS

| | | |
|---|---|---|
| CN | 101465821 A | 6/2009 |
| JP | 08-307545 | 11/1996 |
| JP | 08307545 | 11/1996 |
| JP | 2004-180273 | 6/2004 |
| JP | 2004-206319 | 7/2004 |
| JP | 04046562 | 7/2004 |
| JP | 2007-156708 | 6/2007 |
| JP | 07156708 | 6/2007 |
| JP | 04206319 | 7/2007 |
| JP | 08193451 | 8/2008 |

OTHER PUBLICATIONS

Chinese Office Action in co-pending Application No. 201010587160.2 filed Dec. 7, 2010.
Japanese Office Action with English Translation dated Oct. 28, 2016 (Application No. 2015-112894).
European Office Action dated Sep. 23, 2016 (Application No. 11846484.1).
International Search Report and Written Opinion, dated Mar. 29, 2012 for PCT/US 2011/061780.

\* cited by examiner

PROTECTION OF PRIVACY IN CONNECTION WITH SHIPMENT OF PRODUCTS

CROSS-REFERENCE TO RELATED APPLICATIONS

This Application claims priority to China Patent Application No. 201010587160.2, filed on Dec. 7, 2010, which is hereby incorporated herein by reference in its entirety.

This application claims the benefit of and is a continuation of U.S. patent application Ser. No. 12/975,888, filed Dec. 22, 2010, and entitled "PROTECTION OF PRIVACY IN CONNECTION WITH SHIPMENT OF PRODUCTS," which is hereby incorporated herein by reference in its entirety.

BACKGROUND

Products ordered via an electronic commerce system are often shipped to a purchaser via a private carrier and/or postal service. Contact information, including a shipping address, phone number or other personally identifiable information, often appears on a shipping label to facilitate delivery of the parcel by the carrier to the purchaser. Additionally, shipments from an electronic commerce system can often require in-person delivery of the parcel to the purchaser or an agent of the purchaser, such as another person at the delivery address. Accordingly, in-person delivery may require that the carrier contact the purchaser via telephone contact information associated with the purchaser. Therefore, this information is often placed on a shipping label affixed to the parcel for the convenience of the carrier, so that carrier personnel can contact the purchaser in these situations.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments disclosed herein relate to enhancing user privacy in connection with the purchase and subsequent shipment of products purchased via an electronic commerce system. In prior art systems, a product purchased via an electronic commerce system may be packaged and shipped to the purchaser via certain user identifiable information affixed on a shipping label associated with a parcel containing one or more of the products associated with an order. As some examples, a parcel may be affixed with a shipping label that includes a phone number and/or e-mail address of the purchaser to facilitate delivery of the parcel to the purchaser. For example, a phone number designated by the purchaser can be used by the carrier to contact the purchaser so that in-person delivery or delivery to an agent of the purchaser can be completed. As can be appreciated, some shipments may require a signature of the purchaser or a person at a premises to which the parcel is shipped. Other shipments may be designated cash on delivery (COD), and require the carrier to collect payment for the product in connection with its delivery. Accordingly, contact details associated with the purchaser can facilitate delivery of the parcel in these circumstances, but can also raise privacy concerns regarding the contact details that may be affixed to a shipping label. Therefore, embodiments of the present disclosure can allow a carrier to contact a purchaser regarding delivery of a parcel without allowing the carrier access to actual contact details of the purchaser.

Figure 1:
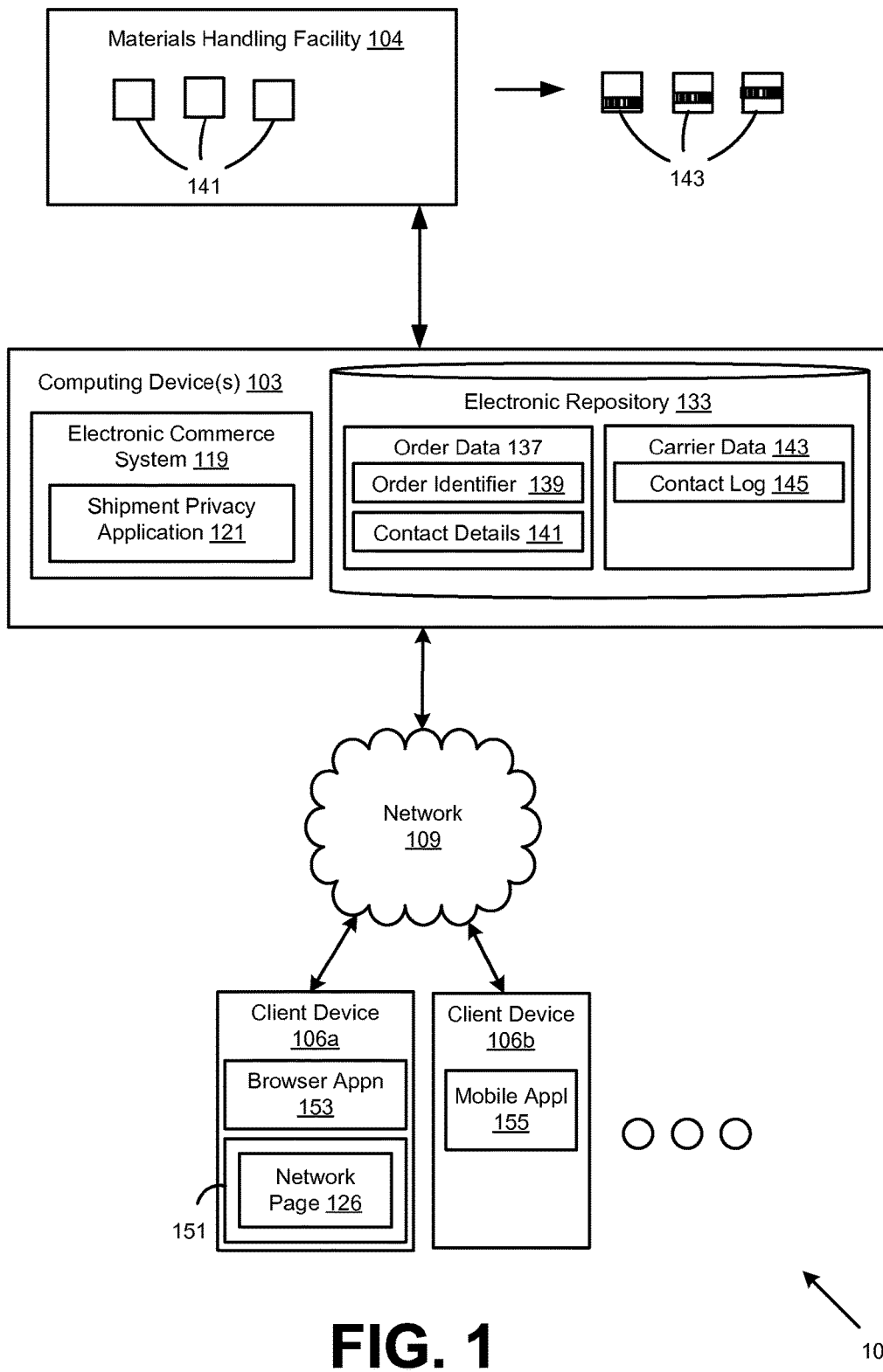
FIG. 1 is a drawing of a networked environment according to various embodiments of the present disclosure.

Accordingly, reference is made to FIG. 1, in which a networked environment 100 for enhancing purchaser privacy in connection with parcel shipments is shown. The networked environment 100 includes, for example, at least one computing device 103 employed in conjunction with the operation of at least one materials handling facility 104. In the depicted example, the networked environment 100 also includes at least one client 106. In one embodiment, the at least one computing device 103 can implement an electronic commerce system that receives and processes orders for products and/or items from a client 106. Orders can be fulfilled by a materials handling facility 104, in which items and/or products are picked from inventory, packaged, and shipped to a destination. To facilitate delivery of a shipment to a destination designated by the purchaser, a shipping label is affixed at the materials handling facility 104, which contains a destination address as well as obfuscated contact details as described hereinbelow.

In the depicted non-limiting example of FIG. 1, the computing device 103 may represent multiple computing devices 103 that may be arranged to work in coordination with each other. Alternatively, such computing devices 103 may be arranged in some other manner, as can be appreciated. As a non-limiting example, various components of the depicted computing device 103 can be separate or segmented onto various computing devices 103 that can communicate over a network. Likewise, the client 106 is representative of multiple clients 106 that are configured to access information on the computing device 103. Additionally, the materials handling facility 104 may represent a plurality of materials handling facilities 104 that can also be geographically disparate. Both the computing device 103 and the client 106 are coupled to the network 109.

The computing device 103 is configured to execute various applications such as, for example, a shipment privacy application 121, an electronic commerce system 119, and other applications. The shipment privacy application 121 is executed to generate temporary contact information that can be used by a carrier to contact a purchaser in connection with the delivery of a parcel shipped from the materials handling facility 104. In some embodiments, the temporary contact information can also be employed by a purchaser to contact a carrier assigned to deliver a parcel containing products associated with the order. The electronic commerce system 119 may include network page server functionality, such as a hypertext transfer protocol (HTTP) server. In some embodiments, the functionality of the shipment privacy application 121 may be included in the electronic commerce system 119. In other embodiments, the shipment privacy application 121 may be executed as a sub-module of the electronic commerce system 119, or as a separate, standalone application, etc. It should be understood that the depicted embodiment of an electronic commerce system 119 executing the shipment privacy application 121 is but one example.

For example, the electronic commerce system 119 generates network pages, such as web pages or other types of network content, that are provided to client devices 106a/106b in response to requests for the purposes of selecting items for purchase, rental, download, lease, or other form of consumption and to perform other tasks as will be described. In other embodiments, the electronic commerce system 119 facilitates the generating of data for display on a user interface rendered by another type of application executed on a client device 106a/106b. Additionally, the electronic commerce system 119 can facilitate access by a user to a user account, which may contain profile data and other user specific data. The electronic commerce system 119 can facilitate the storage of shipping information, payment information, order history and other data with respect to the various user accounts.

Also, the computing device 103 can include at least one electronic repository 133, which may comprise data and applications operable to provide access to the data stored therein. It should be appreciated that the electronic repository 133 may or may not reside within a computing device 103, but may be accessible via a network to the computing device 103. The electronic repository 133 can include order data 137, which comprises information regarding orders placed by users manipulating a user interface on a client 106. Order data 137 may include an order identifier 139, items within an order, payment information, shipping address, and other data related to orders placed via an electronic commerce system. Order data 137 can also include contact details 141 generated by the shipment privacy application 121 with which carriers delivering a parcel associated with the order can contact a purchaser. The electronic repository 133 can also include carrier data 139, which can include information related to a carrier in connection with delivery of a shipment to a purchaser that can be stored in a contact log 145. Embodiments of the disclosure can log any attempts to contact a purchaser using contact information generated according to embodiments of this disclosure. In one example, the shipment privacy application 121 can log a time stamp, caller information, and a recording of any conversation or exchange between a carrier and a purchaser using the contact details generated by the shipment privacy application 121.

The electronic repository 133, order data 137, and carrier data 143 can also include other data related to users, products and orders, as can be appreciated, but are not necessary to discuss herein for an understanding of the various embodiments of the disclosure. Additionally, it should be appreciated that the electronic repository 133 can be implemented in a separate computing device that may be located in a separate installation or location. The depicted table structure of the electronic repository 133 is one example of how data can be structured therein according to embodiments of this disclosure, as it should be appreciated that data can be structured in many different ways across multiple data stores implemented in various computing devices. As one example, data related to users, carriers, products, product pricing, shipping terms, etc., can be extracted by the shipment privacy application 121 by performing queries against data stored in the data store in wholly different table structures. Accordingly, it should be appreciated that the depicted electronic repository 133 and the table structure shown therein is but one example given for ease of depiction and explanation of various embodiments of this disclosure.

At least one client 106 communicates with various services on the computing devices 103 as will be described. The client 106 may comprise various types of computer systems such as, for example, a desktop, laptop, or other computer system with like capability. To this end, the client 106 may also comprise a personal digital assistant, cell phone, or other portable device with like capability as can be appreciated. The client 106 may interface with the computing device 103 using various applications such as a browser application, dedicated applications, or other applications as can be appreciated. In one embodiment, various user interfaces can be generated on a display device of the client 106 to facilitate interaction with the various systems or components implemented on the computing device 103. In this way, users may interact with the electronic commerce system 119 in order to view and/or order items available in an electronic commerce system. In connection with fulfillment of an order submitted by a purchaser via a client 106, the shipment privacy application 121 can initiate the generating and/or printing of shipment labels to be affixed to parcels that will be shipped from a materials handling facility 104 to the purchaser as described in further detail herein. It should also be appreciated that, in some embodiments, the materials handling facility 104 can include one or more computing devices that can facilitate manufacture shipment labels, which will also be described in further detail herein.

The depicted network 109 may include, for example, any type of networked environment such as the Internet, intranets, local area networks, wide area networks (WANs), wireless networks, cellular networks, phone networks, or other suitable networks as can be appreciated or any combination of two or more such networks. According to various embodiments, the computing device 103 includes various applications that are executed, for example, to effectuate the handling and processing of orders, inventory and shipment tracking, handling, and fulfillment in an electronic commerce system. To this end, an electronic commerce system 119 is executed in the computing device(s) 103, which may in turn execute other systems to facilitate interacting with a client 106 via the network 109. Systems running in an electronic commerce system 119 may also include, but are not limited to, order fulfillment systems, dynamic network or web page servers, inventory systems, or other systems as can be appreciated. However, such systems are not described herein in detail.

The materials handling facility 104 may include data processing systems that communicate with the computing device 103 via the network 109 or other communications link. Additionally, certain components to facilitate embodiments of the disclosure may be implemented in one computing device 103, while other components may be implemented in a second computing device 103. The functionality discussed herein as occurring in one computing device 103 (as a non-limiting example) is but one example. For instance, a first computing device may execute software applications or components to facilitate the receiving and processing of orders in an electronic commerce system, while a second computing device may execute software applications or components to facilitate the packaging and fulfillment of orders in a materials handling facility 104.

A materials handling facility 104 may include one or more of, but is not limited to, warehouses, distribution centers, cross-docking facilities, order fulfillment centers (also referred to as fulfillment facilities), packaging facilities, shipping facilities, or other facilities or combination of facilities for performing one or more functions of material (inventory) handling. Although the materials handling facility 104 is described herein with reference to a fulfillment center and/or inventory warehouse, it is understood that a materials handling facility 104 provides one example of many other types of environments to which the principles described herein apply.

The materials handling facility 104 may comprise, for example, a large warehouse or other structure that includes at least one packaging area where order items 141 that are associated with user orders can be packaged and/or shipped. Accordingly, order items 141 can be packaged and shipped to a destination as parcels 143 with a shipping label according to an order placed in an electronic commerce system as directed by the electronic commerce system 119. The shipment privacy application 121 can direct the generating of shipping labels for parcels 143, where the shipping labels facilitate delivery to the purchaser and that also contain the purchaser privacy features described herein. Additionally, a materials handling facility 104 can include another residence, business, or other facility in the case of a user-to-user transaction where one user of the electronic commerce system 119 offers one or more products for sale to another user of the electronic commerce system 119. Accordingly, in such a scenario, the seller can retrieve a representation of a shipping label from the shipment privacy application 121, affix the shipping label to a parcel, and ship the parcel to a buyer.

Now that the various components of the depicted non-limiting networked environment 100 have been described, various aspects of the shipment privacy application 121 will be described. In the context of an order placed by a user or purchaser via an electronic commerce system, the shipment privacy application 121 can generate shipping labels that can be affixed to a shipment from the materials handling facility 104. The generated shipping labels can contain one or more privacy features that obfuscate at least one contact detail or contact identifier of the user. In one embodiment, the shipment privacy application 121 can generate a shipping label that contains an obfuscated telephone number associated with the purchaser. Such an obfuscated telephone number can be used by a carrier tasked with delivering the parcel to contact the user in connection with delivery of the parcel, but the obfuscated telephone number is not an actual telephone number of the purchaser. Therefore, the telephone number of a purchaser cannot be known simply by reading the shipping label.

In the case of an obfuscated telephone number, the shipment privacy application 121 can generate a temporary telephone number that can be used to contact a purchaser. In some embodiments, the shipment privacy application 121 can generate a combination of a telephone number and an identifier or code that be entered by the carrier in order to contact the purchaser. The shipment privacy application 121 can receive calls made to the telephone number placed on the shipping label and forward the call to the purchaser. In this way, the shipment privacy application 121 can connect calls made by a carrier to a purchaser attempting to contact the purchaser using a telephone number printed on the shipping label. The shipment privacy application 121 can also require an additional layer of authentication by the carrier to prevent a caller lacking these additional authentication credentials from being able to contact the purchaser. As one example, in order to contact a purchaser associated with a particular parcel, the shipment privacy application 121 may require a carrier to call a number displayed on a shipping label, enter an identifier on the shipping label that is associated with the purchaser and/or the order, as well as an additional carrier authentication code or password that is not printed on a shipping label and that is assigned or known to the carrier. In other embodiments, the shipment privacy application 121 can verify the identity of a carrier by identifying a telephone number from which the carrier is calling and verifying that the telephone number is associated with the carrier.

In some embodiments, the contact information generated by the shipment privacy application 121 and placed on a shipping label can be temporary in nature. In one embodiment, in the case of a telephone number used to contact a purchaser that is generated by the shipment privacy application 121, the shipment privacy application 121 can generate such a telephone number from a pool of available numbers. Once the parcel is delivered to the purchaser (e.g., by retrieving shipment tracking information related to the parcel), the shipment privacy application 121 can return the generated telephone number to the pool for use in connection with subsequent orders and parcels. In another embodiment, the shipment privacy application 121 can immediately, or some period of time thereafter, upon detecting delivery of the parcel to the purchaser, deactivate the generated contact details or contact identifier so that the purchaser may no longer be contacted using the generated contact details.

Additionally, because the shipment privacy application 121 can act as arbiter of any attempts made to contact a purchaser using the contact details placed on a shipping label, the shipment privacy application 121 can also log any attempt made to contact a purchaser. The shipment privacy application 121 can store, in an entry in the carrier data 143 associated with a parcel being delivered by a carrier, a time stamp, an originating telephone number, and other relevant data associated with an attempt to contact the purchaser. The shipment privacy application 121 can also record a conversation or any type of exchange between the carrier and purchaser and store the conversation or exchange in the contact log 145 of the electronic repository 133.

The shipment privacy application 121 can store this data related to the communications between the carrier and purchaser for quality control purposes as well as for verifying any claimed delivery attempts made by the carrier. The shipment privacy application 121 can also provide a touchtone delivery status workflow associated with a telephone number provided on a shipping label. In one embodiment, a carrier can be presented with various options when calling a telephone number provided on a shipping label, including the option to contact the purchaser in connection with delivery of a parcel. Another option can include providing information about the delivery status of a parcel to the shipment privacy application 121 via a touchtone workflow. As one example, the carrier can provide a delivery confirmation or a delivery exception associated with a delivery attempt via such a touchtone workflow. The touchtone workflow can also commence after a call is terminated. For example, the touchtone workflow can allow the carrier to summarize via touch-tone input an outcome of a conversation with a customer even if delivery was not completed.

Such outcomes may comprise, for example, that the customer refused to remit payment, the customer indicated an incorrect telephone number, the customer refuses delivery, the customer requests delivery at a later date and/or time, the customer requests rerouting of a shipment to a new address, or other status indication.

The shipment privacy application 121 can also provide the contact details or contact identifier generated and placed on a shipping label to a purchaser associated with an order. The purchaser can use the contact details on a shipping label to contact a customer service agent regarding the order or regarding shipment of a parcel associated with the order. In some embodiments, the purchaser can use the same contact details generated and placed on a shipping label to contact the carrier regarding delivery of a parcel. In one example, if or when the carrier initiates contact with the purchaser using the shipping label contact details, the shipment privacy application 121 can receive such a call and initiate a second call with the purchaser. The shipment privacy application 121 can modify the caller identification information associated with the second call to reflect a call being made from the contact details printed on the shipping label. In this example, the shipment privacy application 121 can connect the first call and the second call together. Accordingly, the purchaser can attempt to return such a call using the telephone number reflected in the contact details, which can also be routed through the shipment privacy application 121. Therefore, in this way, the shipment privacy application 121 can also log any attempts made by the purchaser to contact the carrier for quality control purposes and to verify any claimed delivery attempts to the purchaser made by the carrier.

Additionally, during a call facilitated by the shipment privacy application 121 that is initiated by either the customer or a carrier, the shipment privacy application 121 can facilitate inclusion of a third party on the call where necessary. In one example, during a call initiated by a customer to the carrier, the customer can provide touch-tone input that initiates a call to a representative of an electronic commerce system operator and generates a conference call between all of the parties.

Figure 2:
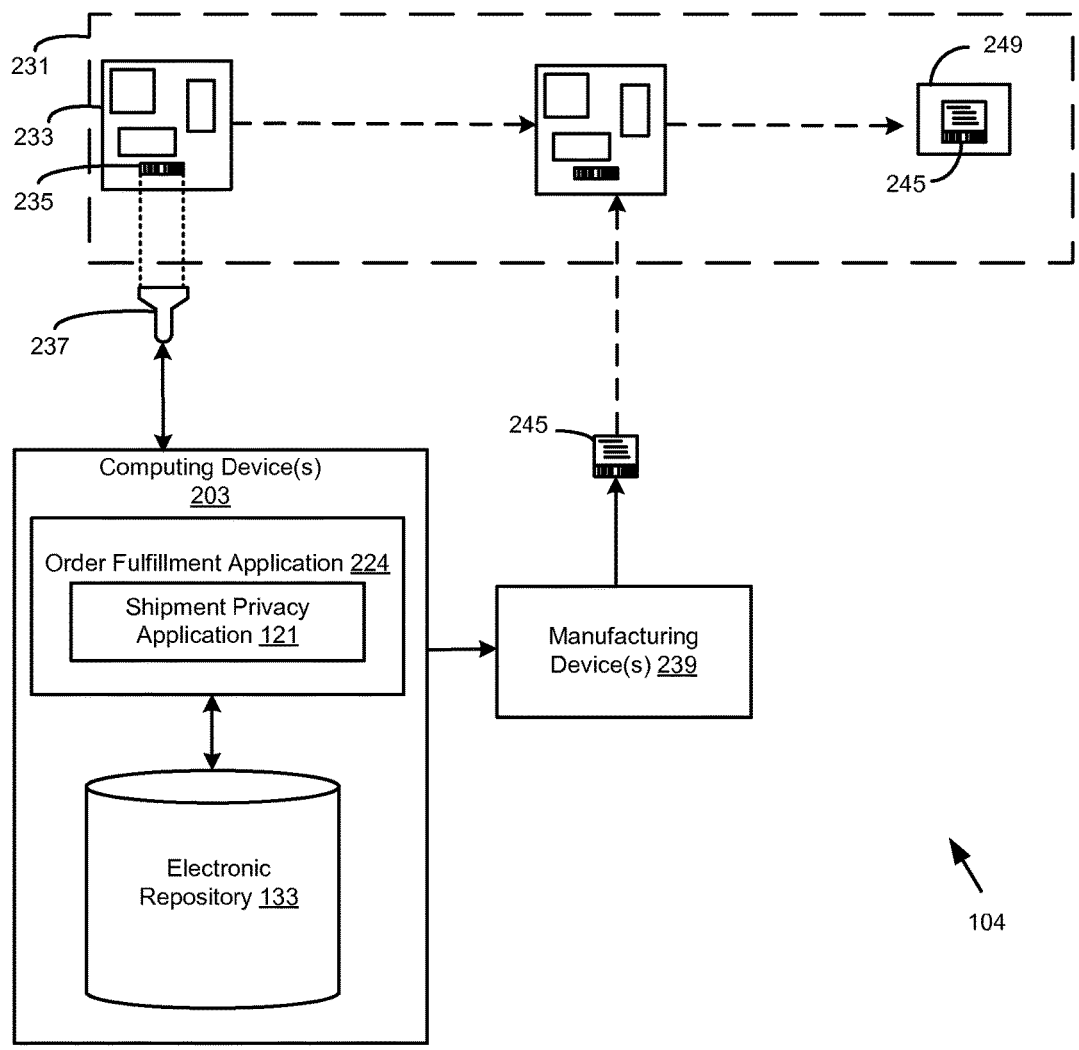
FIG. 2 is a drawing of a materials handling facility according to various embodiments of the present disclosure.

Reference is now made to FIG. 2, which illustrates an alternative depiction of a materials handling facility 104. The materials handling facility 104 can also include a computing device 203 that facilitates the creation of shipping labels with a privacy feature as described above. The computing device 203 can be structured similarly to the computing device 103 of FIG. 1, or in various other configurations as can be appreciated. The computing device 203 can also include an electronic repository 133 that houses the data regarding orders, such as the purchasers, products and carriers associated with the order. In some embodiments, the computing device(s) 203 in a materials handling facility 104 can be in data communication with an electronic repository 133 facilitating an electronic commerce system. For example, the computing device 203 in a materials handling facility 104 can be in communication with a computing device 103 implementing an electronic commerce system in order to access order data 137 and/or carrier data 143. Accordingly, it should be appreciated that an electronic repository 133 may not be present in a computing device 203 in a materials handling facility 104, and that the depiction in FIG. 2 is merely an example.

An order fulfillment application 224 can be executed in the computing device 203 to facilitate fulfillment of orders placed in an electronic commerce system by the materials handling facility 104. The order fulfillment application 224 can retrieve orders from the electronic repository 133 and inform personnel or devices configured to pick items from inventory in the materials handling facility 104 to facilitate assembling of orders in a packaging area 231. To further facilitate assembling of items in the packaging area 231, items can be assembled in an order container 233 or other container that can be identified with an order identifier 235. An order container 233 can include a bin, tote, pallet, or other container as can be appreciated. The order identifier 235 can correspond to an order placed in an electronic commerce system and accessible to the order fulfillment application 224 and/or stored in the order data 137. An order identifier scanner 237 can be employed to identify an order to which an order container 233 corresponds. The order identifier scanner 237 can be in data communication with the computing device 203.

The computing device 203 can execute the shipment privacy application 121, which, in the non-limiting example of the depicted materials handling facility 104 of FIG. 2, can implement the functionality of initiating manufacture and/or printing of shipping labels containing contact details for a purchaser as described herein. It should be appreciated that all of the functionality of the shipment privacy application 121 can be implemented in a single computing device in a single installation and that the depicted examples of FIGS. 1 and 2 illustrates one case of various parts of the functionality of the shipment privacy application 121 being executed in different installations.

In the depicted example, the order fulfillment application 224 can receive an order identifier 235 from the order identifier scanner 237 when an order container 233 is in the packaging area 231. The shipment privacy application 121 can facilitate the printing of shipping labels containing the privacy features as described herein. The shipment privacy application 121 can, in one embodiment, generate a temporary and/or obfuscated contact identifier associated with the purchaser and print a shipping label containing an obfuscated contact identifier along with a shipping address, tracking number, postage, or other information facilitating shipment of the product. The shipment privacy application 121 can initiate printing of the shipping label in one or more manufacturing devices 239. A manufacturing device 239 can include a printing device or any number of other devices configured to create a shipping label with a privacy feature as described herein. In the depicted example, the shipment privacy application 121 initiates printing of a shipping label 245 containing the privacy feature as discussed herein in a manufacturing device 239. The shipping label 245 can be affixed to a parcel 249 and shipped to a destination address designated by the purchaser from the materials handling facility 104.

In some embodiments, the party generating a shipment may not be located in a materials handling facility 104. As one example, the party selling a product and/or shipping a parcel may be a third party seller that offers products for sale via the electronic commerce system 119. Accordingly, such a seller can retrieve a representation of a shipping label 245 from the shipment privacy application 121 via a network and print the shipping label 245 on a printing device. Accordingly, the seller can then affix the shipping label 245 to a parcel for shipment.

In such a scenario, the shipping label 245 provided to a seller from the shipment privacy application 121 can omit even an obfuscated contact identifier and include a shipment identifier with which a carrier may use to retrieve information about shipment of the parcel. Accordingly, a carrier can then access information such as the obfuscated contact identifier, a delivery address, and other information necessary to complete delivery of the parcel.

Figure 3:
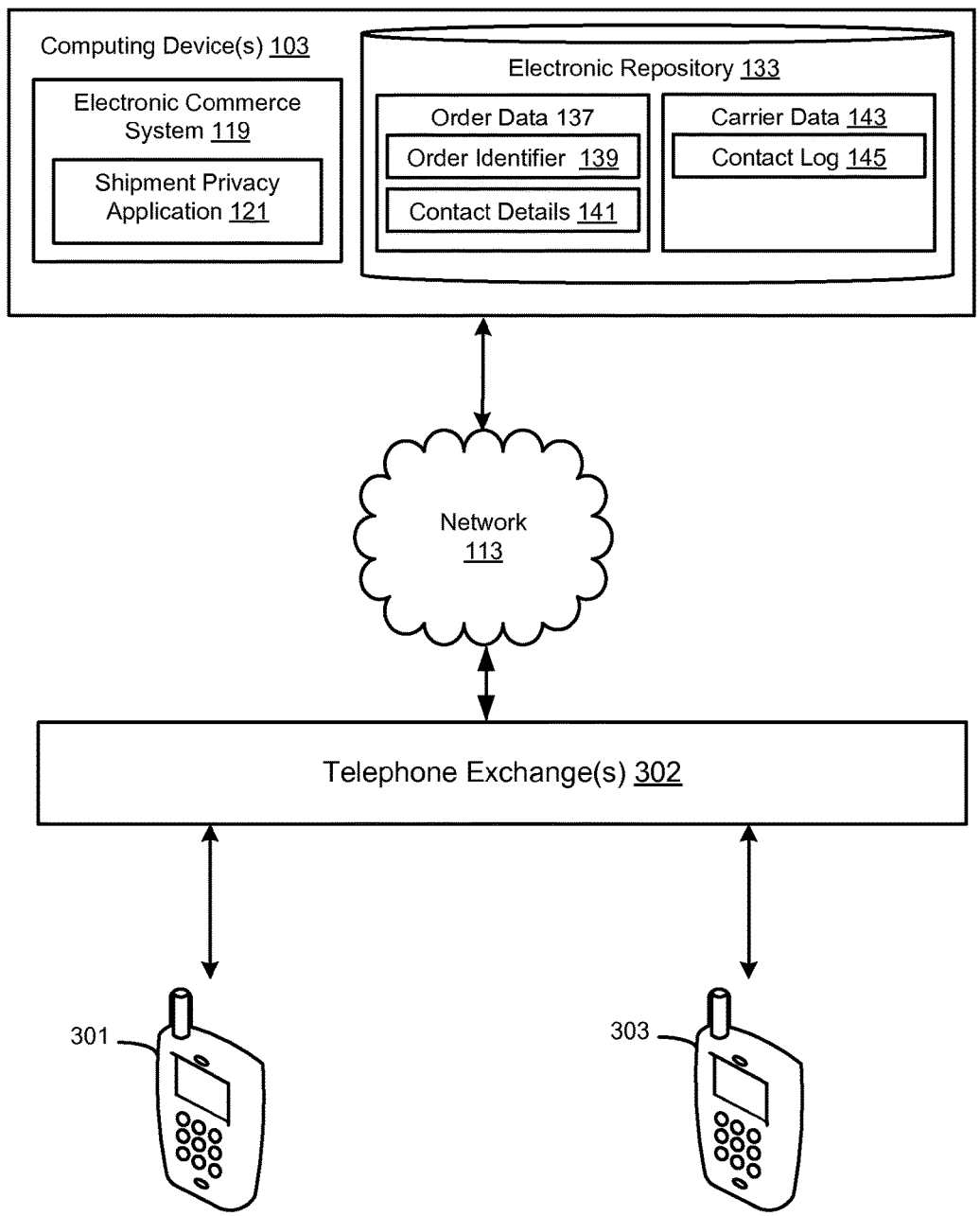
FIG. 3 is a drawing of the shipment privacy application of FIG. 1 routing communications between a carrier and a purchaser according to various embodiments of the present disclosure.

Referring next to FIG. 3, shown is an example of a computing device 103 moderating telephone contact between a carrier and a purchaser. As described above, a carrier may often contact a purchaser of an order for which the carrier is assigned to deliver a parcel. To contact the purchaser, the carrier can use a contact identifier (e.g., a telephone number, an e-mail address, a voice over IP identifier, etc.) generated by the shipment privacy application 121 and printed on a shipping label associated with the parcel. Accordingly, in the case of a telephone number placed on a shipping label on a parcel, the telephone number can be a number assigned to and/or owned by an operator of an electronic commerce system.

With this framework in mind, the carrier can initiate a phone call via a carrier telephone 301 to make contact with the purchaser. A first call placed to the telephone number can be routed through one or more telephone exchanges 302 and intercepted by the shipment privacy application 121. The shipment privacy application 121 can then place a second call to an actual contact identifier associated with the purchaser, which is obfuscated or hidden by the contact identifier placed on the shipping label. If a purchaser accepts the second call made to an actual contact identifier (e.g., via a purchaser telephone 303), the shipment privacy application 121 can connect the first call and the second call, allowing the carrier phone 301 and the purchaser phone 303 to communicate.

The shipment privacy application 121 can record various information regarding the call between the carrier phone 301 and purchaser phone 303 in the contact log 145 associated with a carrier. The shipment privacy application 121 can record a time stamp associated with the call, call duration, record the conversation, and log any other details as described herein and as should be appreciated. The shipment privacy application 121 can also allow a call placed by the purchaser to the contact identifier placed on a shipping label, which, for example, can be provided to the purchaser in an order confirmation, to be routed to a contact number associated with a carrier. In other embodiments, such a call can be placed by the purchaser to another customer service number or contact number associated with the electronic commerce system 119.

In such an embodiment, a call placed by the purchaser can be routed to a phone assigned to specific carrier personnel or to a general customer service number associated with the carrier. If such a call is placed, the shipment privacy application 121, before connecting a call made by the purchaser to the carrier, can advise the purchaser that the purchaser need not provide the carrier with actual contact details of the purchaser, and that the purchaser can be contacted by the carrier using the contact details generated by the shipment privacy application 121 and placed on a shipping label and/or provided to the carrier. As an additional example, in a delivery scenario that includes several carriers employed in a delivery pipeline to deliver a parcel to a purchaser, the shipment privacy application 121 can determine to which carrier in the delivery pipeline a purchaser should be routed should a purchaser have issues with parcel delivery. As one example, a first carrier may be employed to deliver a parcel from a materials handling facility 104 to a second last-mile carrier tasked to deliver the parcel to the purchaser. Accordingly, the shipment privacy application 121 can determine whether a purchaser attempting to contact a carrier regarding delivery should be routed to the first carrier or the second last-mile carrier. In one embodiment, the shipment privacy application 121 can retrieve tracking data available for the shipment to determine which carrier has possession of the parcel and route a call made by the purchaser to the carrier in possession of the parcel. In another embodiment, the shipment privacy application 121 can determine which of the carrier has ultimate responsibility for delivery of the parcel (e.g., the second last-mile carrier is a subcontractor), and route a call made by the purchaser to the carrier with ultimate delivery responsibility.

Figure 4:
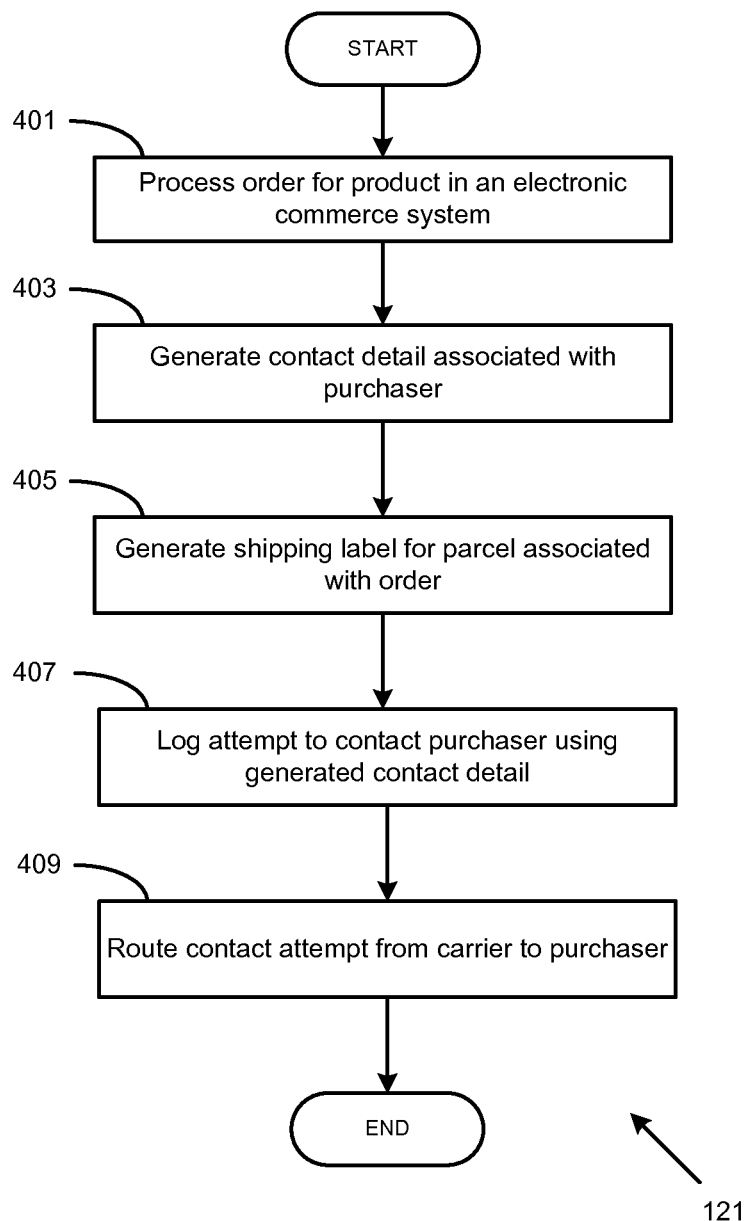
FIG. 4 is a flowchart illustrating one example of functionality implemented as portions of the shipment privacy application executed in a computing device in the networked environment of FIG. 1 according to various embodiments of the present disclosure.

Referring next to FIG. 4, shown is a flowchart that provides one example of the operation of a portion of the shipment privacy application 121 according to various embodiments. It is understood that the flowchart of FIG. 4 provides merely an example of the many different types of functional arrangements that may be employed to implement the operation of the portion of the shipment privacy application 121 as described herein. As an alternative, the flowchart of FIG. 4 may be viewed as depicting an example of steps of a method implemented in the computing device 103 (FIG. 1) according to one or more embodiments.

Beginning with box 401, an order in the electronic commerce system 119 is processed, and order details are retrieved by the shipment privacy application. The shipment privacy application 121 can retrieve information about the shipping address, shipping terms, etc., as well as information about the purchaser, such as telephone contact details, an e-mail address, etc. In box 403, the shipment privacy application can generate a contact identifier associated with the purchaser to be placed on a shipping label. The generated contact identifier can hide an actual contact identifier (e.g., a phone number, an e-mail address, a voice over IP identifier, a virtual identity, etc.) associated with the purchaser. In box 405, the shipment privacy application 121 can generate a shipping label containing the generated contact identifier as well as a destination address and other information necessary to ship a parcel to the purchaser.

When the parcel is shipped to the purchaser from a materials handling facility 104 via a carrier, the shipment privacy application 121 can log any attempts to contact the purchaser using the generated contact details, as is described above. In box 409, the shipment privacy application 121 can route attempts to contact the purchaser using the generated contact details to the purchaser so that a carrier may contact a purchaser (e.g., for the purposes of delivering the parcel) using the generated contact details.

Figure 5:
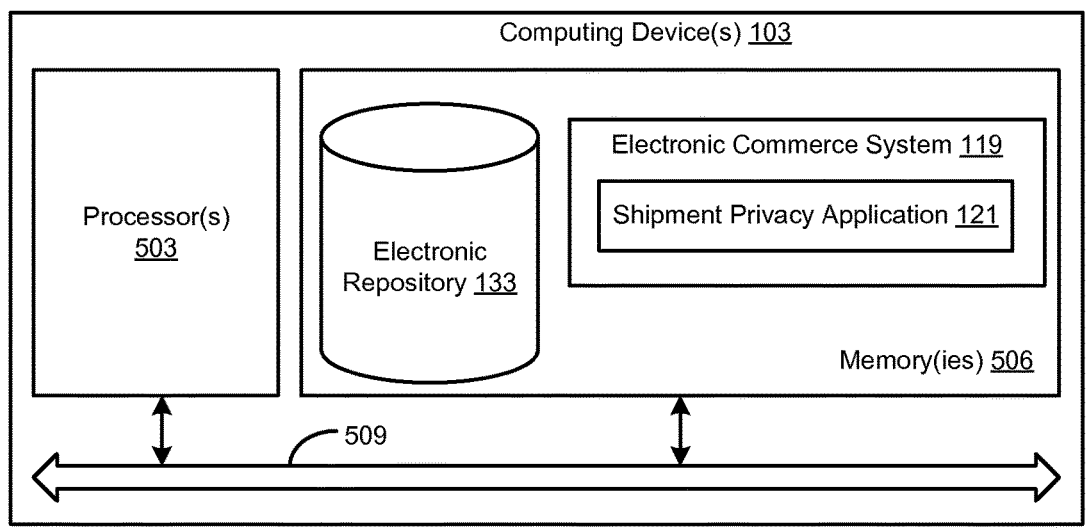
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are electronic commerce system 119, shipment privacy application 121, and potentially other applications. Also stored in the memory 506 may be a electronic repository 133 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce system 119, shipment privacy application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the shipment privacy application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 119, shipment privacy application 121, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program comprising machine readable instructions that, when executed by a processor of at least one computing device, causes the at least one computing device to at least:
   generate a shipping label for a parcel, the shipping label comprising a purchaser contact identifier, the purchaser contact identifier associated with an actual contact identifier of a purchaser, the purchaser contact identifier comprising a first telephone number and the actual contact identifier comprising a second telephone number; and
   receive a first communication directed to the first telephone number; and
   initiate a second communication to the second telephone number in response to receiving the first communication.

2. The non-transitory computer readable medium of claim 1, wherein the program further comprises machine readable instructions that cause the at least one computing device to at least:
   detect whether an originating telephone number associated with the first communication is associated with the purchaser; and
   initiate a third communication directed to a carrier telephone number when the originating telephone number is associated with the purchaser.

3. The non-transitory computer readable medium of claim 1, wherein the program further comprises machine readable instructions that cause the at least one computing device to at least:
   detect whether a caller associated with the first communication is calling from a number associated with a carrier;
   initiate a delivery confirmation workflow;
   receive a delivery confirmation via the delivery confirmation workflow; and
   store a delivery status corresponding to the delivery confirmation in a data store associated with an electronic commerce system.

4. A system, comprising:
   at least one computing device comprising a processor and a memory; and
   an application comprising machine readable instructions stored in the memory that, when executed by the processor, cause the at least one computing device to at least:
      generate a shipping label for a parcel, the shipping label comprising a destination address, a shipment identifier, and a purchaser contact identifier, wherein the purchaser contact identifier is associated with an actual contact identifier of a purchaser; and
      route an attempt to contact the purchaser using the purchaser contact identifier to the actual contact identifier.

5. The system of claim 4, wherein the machine readable instructions that cause the at least one computing device to route the attempt to contact the purchaser to the actual contact identifier further comprise machine readable instructions that cause the at least one computing device to at least:
   receive a first communication directed to the purchaser contact identifier;
   initiate a second communication directed to the actual contact identifier associated with the purchaser; and
   connect the first communication and the second communication.

6. The system of claim 5, wherein the application further comprises machine readable instructions that cause the at least one computing device to at least log the attempt to contact the purchaser.

7. The system of claim 6, wherein the machine readable instructions that cause the at least one computing device to log the attempt to contact the purchaser further comprise machine readable instructions that record at least one of: a time stamp or an originating telephone number associated with the first communication.

8. The system of claim 6, wherein the machine readable instructions that cause the at least one computing device to log the attempt to contact the purchaser further comprise machine readable instructions that cause the at least one computing device to at least record a telephone conversation associated with the attempt.

9. The system of claim 4, wherein the application further comprises machine readable instructions that cause the at least one computing device to at least:
   receive a first communication directed to the purchaser contact identifier;
   detect whether an originating number associated with the first communication is associated with the purchaser;
   initiate a second communication directed to a carrier telephone number; and
   connect the first communication and the second communication.

10. The system of claim 4, wherein the application further comprises machine readable instructions that cause the at least one computing device to at least:
    receive a first telephone call directed to the purchaser contact identifier;
    detect whether a caller associated with the first telephone call is calling from a number associated with a carrier;
    initiate a delivery confirmation workflow;
    receive a delivery confirmation via the delivery confirmation workflow; and
    store a delivery status corresponding to the delivery confirmation in a data store associated with an electronic commerce system.

11. The system of claim 4, wherein the application further comprises machine readable instructions that cause the at least one computing device to at least:
    detect whether the parcel is delivered to the purchaser; and
    expire the purchaser contact identifier when the parcel is delivered to the purchaser.

12. The system of claim 4, wherein the application further comprises machine readable instructions that cause the at least one computing device to at least:
    generate a pool of a plurality of telephone numbers from which the purchaser contact identifier is retrieved;
    assign one of the plurality of telephone numbers as the purchaser contact identifier; and return the one of the plurality of telephone numbers to the pool in response to the parcel being delivered to the purchaser.

13. A method, comprising:

identifying, by a computing device, a purchaser associated with an order for at least one product in an electronic commerce system;

retrieving, by the computing device, a contact detail associated with the purchaser;

generating, by the computing device, a shipping label contact detail, the shipping label contact detail being different from the contact detail; and generating, by the computing device, a shipping label for a parcel, the shipping label comprising a destination address, a shipment identifier, and the shipping label contact detail.

14. The method of claim 13, further comprising:

receiving, by the computing device, a first telephone call directed to the shipping label contact detail;

initiating, by the computing device, a second telephone call directed to the contact detail; and connecting, by the computing device, the first telephone call and the second telephone call.

15. The method of claim 13, further comprising:

receiving, by the computing device, a first telephone call directed to the shipping label contact detail;

detecting, by the computing device, whether an originating telephone number associated with the first telephone call is a number associated with the purchaser;

initiating, by the computing device, a second telephone call directed to a carrier telephone number; and connecting, by the computing device, the first telephone call and the second telephone call.

16. The method of claim 13, further comprising:

determining, by the computing device, that the parcel has been delivered to the purchaser;

receiving, by the computing device, a first telephone call directed to the shipping label contact detail;

detecting, by the computing device, whether a telephone number associated with the first telephone call is associated with a carrier;

initiating a delivery confirmation workflow;

receiving a delivery confirmation via the delivery confirmation workflow; and storing the delivery confirmation in a data store associated with the electronic commerce system.

17. The method of claim 13, further comprising logging, by the computing device, an attempt to contact the shipping label contact detail by recording at least one of: a telephone conversation associated with the attempt, a time stamp associated with the attempt, or a caller telephone number associated with the attempt.

18. The method of claim 13, further comprising:

detecting, by the computing device, whether the parcel is delivered to the purchaser; and expiring, by the computing device, the shipping label contact detail in response to the parcel being delivered to the purchaser.

19. The method of claim 13, wherein the shipping label contact detail further comprises a telephone number.

20. The method of claim 19, further comprising:

generating, by the computing device, a pool of a plurality of telephone numbers from which the telephone number is retrieved;

assigning, by the computing device, one of the plurality of telephone numbers to the shipping label contact detail; and returning, by the computing device, the one of the plurality of telephone numbers to the pool when the parcel is delivered to the purchaser.

* * * * *